United States Patent
Woo (10) Patent No.: US 11,679,745 B2
(45) Date of Patent: Jun. 20, 2023

(54) REAR-END COLLISION AVOIDANCE APPARATUS AND METHOD, AND VEHICLE CONTROL APPARATUS INCLUDING SAME

(71) Applicant: MANDO CORPORATION, Pyeongtaek-si (KR)

(72) Inventor: Hyeongmin Woo, Seongnam-si (KR)

(73) Assignee: HL Klemove Corp., Incheon (KR)

(*) Notice: Subject to any disclaimer, the term of this patent is extended or adjusted under 35 U.S.C. 154(b) by 120 days.

(21) Appl. No.: 16/595,821

(22) Filed: Oct. 8, 2019

(65) Prior Publication Data

US 2020/0108805 A1    Apr. 9, 2020

(30) Foreign Application Priority Data

Oct. 8, 2018  (KR) .................... 10-2018-0120032
May 23, 2019  (KR) .................... 10-2019-0060372

(51) Int. Cl.
  *B60T 7/12*    (2006.01)
(52) U.S. Cl.
  CPC ............. *B60T 7/12* (2013.01); *B60T 2210/32* (2013.01)
(58) Field of Classification Search
  CPC ................ B60T 7/12; B60T 2210/32
  See application file for complete search history.

(56) References Cited

U.S. PATENT DOCUMENTS

| 9,604,607 | B2* | 3/2017 | Hammoud | G05D 1/0088 |
| 2002/0011366 | A1* | 1/2002 | Fuchs | B60T 7/12 |
| | | | | 180/167 |
| 2008/0149437 | A1* | 6/2008 | Herges | B60T 17/221 |
| | | | | 188/138 |
| 2008/0234907 | A1* | 9/2008 | Labuhn | B60T 7/042 |
| | | | | 701/70 |
| 2009/0118886 | A1* | 5/2009 | Tamai | B60W 10/06 |
| | | | | 701/22 |
| 2015/0239437 | A1* | 8/2015 | Ignaczak | B60T 8/17558 |
| | | | | 701/70 |

(Continued)

FOREIGN PATENT DOCUMENTS

| DE | 102014220308 A1 * | 6/2015 | .......... B60W 30/143 |
| EP | 1238876 B1 * | 1/2009 | ......... B60K 31/0008 |

(Continued)

OTHER PUBLICATIONS

Office Action issued in corresponding Korean patent application No. 10-2019-0060372 dated Jun. 4, 2019.

*Primary Examiner* — James J Lee
*Assistant Examiner* — Wenyuan Yang
(74) *Attorney, Agent, or Firm* — Morgan, Lewis & Bockius LLP (57) ABSTRACT

The present embodiment relates to a vehicle control apparatus or a rear-end collision avoidance apparatus, and may optimally set a reactivation condition for performing reactivation of a rear emergency braking function based on whether an engine operates after the rear emergency braking function is deactivated by a driver's braking input in an operation such as backward parking or the like, a vehicle speed and vehicle traveling distance after the rear emergency braking function is deactivated, a separation distance from an initial stoppage position to an obstacle after the rear emergency braking function is deactivated, and the like, thereby securing both convenience and safety of the driver.

20 Claims, 7 Drawing Sheets

(56) References Cited

U.S. PATENT DOCUMENTS

| | | | | |
|---|---|---|---|---|
| 2016/0209841 | A1* | 7/2016 | Yamaoka | B60W 30/00 |
| 2016/0272171 | A1* | 9/2016 | Bunk | B60T 8/17558 |
| 2018/0022346 | A1* | 1/2018 | Murakami | G08G 1/168 |
| | | | | 701/37 |
| 2019/0001938 | A1* | 1/2019 | Takaki | B60T 8/171 |

FOREIGN PATENT DOCUMENTS

| | | |
|---|---|---|
| JP | 2012-121534 A | 6/2012 |
| JP | 5896062 B2 | 3/2016 |
| KR | 10-2017-0077317 A | 7/2017 |

\* cited by examiner

REAR-END COLLISION AVOIDANCE APPARATUS AND METHOD, AND VEHICLE CONTROL APPARATUS INCLUDING SAME

CROSS-REFERENCE OF RELATED APPLICATIONS

This application claims priority to Korean Patent Application No. 10-2018-0120032, filed on Oct. 8, 2018, and Korean Patent Application No. 10-2019-0060372, filed on May 23, 2019, each of which are incorporated herein by reference in their entireties.

BACKGROUND OF THE INVENTION

1. Field of the Invention

The present disclosure relates to a rear-end collision avoidance apparatus and method of a vehicle and, more particularly, to a technique of setting a reactivation condition after deactivating the function of the rear-end collision avoidance apparatus of the vehicle, and accordingly reactivating the rear-end collision avoidance function.

2. Description of the Prior Art

Recently, a variety of Driver Assistance Systems (DASs) have been developed due to the improvement of vehicle control technology. In these DAS systems, a function of securing the stability of a vehicle or increasing the convenience thereof by controlling a steering angle or braking force of the vehicle regardless of the intention of a driver has been developed.

Among such DAS systems, there is a rear-end collision avoidance or Rear Autonomous Emergency Braking (R-AEB) system that automatically brakes a vehicle without a driver's intervention when a rear-end collision is predicted at the backward traveling of the vehicle.

When such a rear-end collision avoidance or R-AEB system is used, it is possible to prevent a collision with an unidentified obstacle located behind the vehicle in a backward parking process, thereby ensuring stability.

The rear-end collision avoidance or R-AEB system operates automatically in a reverse shift state and a constant speed range, imparts the braking force regardless of a driver's control when a driver's braking input occurs until a distance to a rear obstacle reaches a control start threshold distance, and controls the vehicle to stop at a stoppage position where the distance to the rear obstacle reaches a first threshold value.

In addition, such a rear-end collision avoidance or R-AEB system may be designed such that an automatic braking function is deactivated, i.e., the function of the R-AEB system is deactivated when the driver's braking input occurs in a process in which an automatic braking control is executed.

For example, there may be a case where a vehicle must be stopped at a position that is more advanced than the stoppage position set by the R-AEB system due to narrowness of a parking space in backward parking or the like, so that the driver can deactivate the R-AEB system by operating a braking pedal.

However, when there is no definite rule for a reactivation condition of the R-AEB system again after the R-AEB system is deactivated, there is a possibility that driver discomfort may be caused.

SUMMARY OF THE INVENTION

According to the above description, an aspect of the present disclosure is to provide a method of setting a reactivation condition for reactivation a Rear Autonomous Emergency Braking (R-AEB) system after a rear emergency braking function is deactivated by a driver's braking input in the R-AEB system or a rear-end collision avoidance apparatus, thereby securing both convenience and safety of the driver.

Another aspect of the present disclosure is to provide a method of optimally setting a reactivation condition for performing a reactivation of a rear emergency braking function based on whether an engine operates after the rear emergency braking function is deactivated by a driver's braking input in an operation such as backward parking or the like, a vehicle speed and vehicle traveling distance after the rear emergency braking function is deactivated, a distance from an initial stop position to an obstacle after the rear emergency braking function is deactivated, and the like, thereby securing both convenience and safety of the driver.

In accordance with an aspect of the present disclosure, there is provided a vehicle control apparatus including: an image sensor configured to capture image data while having a field of view exterior of a vehicle; a rear sensor configured to capture sensing data for detecting a distance to an obstacle around the vehicle in order to detect a rear obstacle; a controller configured to comprise a processor for processing one or more of the image data captured by the image sensor and the sensing data captured by the rear sensor, wherein the controller performs automatic braking by assigning a braking force to the vehicle when the collision with the rear obstacle is imminent, deactivates automatic braking control when a driver's braking input occurs during an automatic braking operation, and reactivates the automatic braking control by determining a reactivation of the automatic braking control based on one or more of (i) an engine operation state after the automatic braking control is deactivated, (ii) a vehicle speed, (iii) a vehicle traveling distance, and (iv) a separation distance from an initial stoppage position to the obstacle after a Rear Autonomous Emergency Braking (R-AEB) function is deactivated.

In accordance with an aspect of the present disclosure, there is provided A rear-end collision avoidance apparatus including: an image sensor for capturing image data while having a field of view exterior of a rear of the vehicle; a rear sensor for capturing sensing data for detecting a distance to the rear obstacle in the rear of the vehicle, and a TTC with the rear obstacle; a controller comprising at least one processor configured to process the image data captured by the image sensor and the sensing data captured by the rear sensor, wherein controller, responsive at least in part to processing by the at least one processor of the image data and the sensing data, is configured to automatically assign a braking force to a vehicle based on one or more of a distance to a rear obstacle detected by the non-image sensor, and deactivate an automatic braking operation of the controller when a driver's braking input occurs during braking control and determine a reactivation of the controller based on one or more of an engine operation state after the controller is deactivated, a vehicle speed, a vehicle traveling distance, and a separation distance from an initial stoppage position to the obstacle after an R-AEB function is deactivated and to reactivate the controller.

In accordance with an aspect of the present disclosure, there is provided a vehicle control apparatus including: a rear sensor configured to include one or more of an image sensor for capturing image data while having a field of view exterior of a vehicle and a non-image sensor for capturing sensing data for detecting a distance to an obstacle around the vehicle in order to detect a rear obstacle; and a controller configured to control a behavior of the vehicle to prevent a collision with the rear obstacle, wherein the controller includes a processor configured to process one or more of the image data and the sensing data, and the controller performs automatic braking by assigning a braking force to the vehicle when the collision with the rear obstacle is imminent, deactivates automatic braking control when a driver's braking input occurs during an automatic braking operation, and reactivates the automatic braking control by determining a reactivation of the automatic braking control based on one or more of an engine operation state after the automatic braking control is deactivated, a vehicle speed, a vehicle traveling distance, and a separation distance from an initial stoppage position to the obstacle after a Rear Autonomous Emergency Braking (R-AEB) function is deactivated.

At this time, the controller may include an automatic braking controller configured to automatically assign the braking force to the vehicle based on one or more of the detected distance to the rear obstacle and a Time-To-Collision (TTC) with the rear obstacle; a function deactivated controller configured to deactivate a function of the automatic braking controller when the driver's braking input occurs during braking control of the automatic braking controller; and a reactivation controller configured to determine a reactivation of the automatic braking controller based on one or more of the engine operation state after the automatic braking controller is deactivated, the vehicle speed, the vehicle traveling distance, and the separation distance from the initial stoppage position to the obstacle after the R-AEB function is deactivated and configured to reactivate the automatic braking controller.

At this time, the automatic braking controller may start automatic braking when one or more of a distance condition in which the distance to the rear obstacle reaches a control start threshold distance and a time condition in which a collision prediction time to the rear obstacle reaches a control start threshold TTC is satisfied, and then control the vehicle to stop at an automatic braking stoppage position which is a position where the distance to the rear obstacle reaches a first threshold value by assigning the braking force regardless of driver's control when the driver's braking input does not occur.

In addition, the reactivation controller may determine the reactivation of the automatic braking controller when one or more of a first condition in which an engine is turned off at least once after the automatic braking controller is deactivated, a second condition in which the vehicle speed reaches a reactivation speed threshold value after the automatic braking controller is deactivated, a third condition in which the traveling distance of the vehicle reaches a reactivation traveling distance threshold value after the automatic braking controller is deactivated, and a fourth condition in which the distance from the initial stoppage position to the rear obstacle is equal to or greater than a reactivation separation distance threshold value after the automatic braking controller is deactivated is satisfied.

In addition, the reactivation speed threshold value of the second condition may be 5 km/s, the reactivation traveling distance threshold value of the third condition may be 3 m, and the reactivation separation distance threshold value of the fourth condition may be 1 m.

In accordance with another aspect of the present disclosure, there is provided a rear-end collision avoidance apparatus including: an automatic braking controller configured to automatically assign a braking force to a vehicle based on one or more of a distance to a rear obstacle detected by a rear sensor of the vehicle, which includes one or more of an image sensor for capturing image data while having a field of view exterior of a rear of the vehicle and a non-image sensor for capturing sensing data for detecting a distance to the rear obstacle in the rear of the vehicle, and a TTC with the rear obstacle; a function deactivate controller configured to deactivate a function of the automatic braking controller when a driver's braking input occurs during braking control of the automatic braking controller; and a reactivation controller configured to determine a reactivation of the automatic braking controller based on one or more of an engine operation state after the automatic braking controller is deactivated, a vehicle speed, a vehicle traveling distance, and a separation distance from an initial stoppage position to the obstacle after an R-AEB function is deactivated and to reactivate the automatic braking controller.

In accordance with still another aspect of the present disclosure, there is provided a rear-end collision avoidance method including: an automatic braking control operation of automatically assigning a braking force to a vehicle based on one or more of a distance to a rear obstacle detected by a rear sensor of the vehicle and a TTC with the rear obstacle; a function deactivation control operation of deactivating an automatic braking control function when a driver's braking input occurs during braking control of the automatic braking control operation; and a reactivation control operation of determining a reactivation of an automatic braking controller based on one or more of an engine operation state after the automatic braking control function is deactivated, a vehicle speed, a vehicle traveling distance, and a separation distance from an initial stoppage position to the obstacle after an R-AEB function is deactivated and of reactivating the automatic braking controller.

In accordance with yet another aspect of the present disclosure, there is provided a vehicle control apparatus for rear collision prevention, including: a sensor unit configured to include one or more of an image sensor which is disposed at a vehicle to have a field of view exterior of the vehicle and captures image data and a non-image sensor which is disposed at the vehicle and captures sensing data to detect one of objects around the vehicle; and a domain controller configured to include a processor for processing one or more of the image data captured by the image sensor and the sensing data captured by the non-image sensor, wherein the domain controller performs automatic braking by assigning a braking force to the vehicle when a collision with a rear obstacle is imminent, at least partially using of one or more of processing of the image data captured by the image sensor and processing of the sensing data captured by the non-image sensor, deactivates automatic braking control when a driver's braking input occurs during automatic braking, and reactivates the automatic braking control by determining a reactivation of the automatic braking control based on one or more of an engine operation state after the automatic braking control function is deactivated, a vehicle speed, a vehicle traveling distance, and a separation distance from an initial stoppage position to the obstacle after an R-AEB function is deactivated.

In accordance with an aspect of the present disclosure, there is provided a vehicle control apparatus including: an image sensor configured to capture image data while having a field of view exterior of a vehicle; a rear sensor configured to capture sensing data for detecting a distance to an obstacle around the vehicle in order to detect a rear obstacle; and a controller configured to comprise a processor for processing one or more of the image data captured by the image sensor and the sensing data captured by the rear sensor, wherein the controller performs automatic braking by assigning a braking force to the vehicle when the collision with the rear obstacle is imminent, deactivates automatic braking control when a driver's braking input occurs during an automatic braking operation, the controller determines the reactivation of the automatic braking control when at least one of the first condition and the second condition is satisfied, and wherein the first condition determines that the cumulative movement distance of the vehicle is reset after the automatic braking control is switched to inactive. The moving distance is equal to or greater than the threshold, and wherein the second condition is that the distance from the position where the vehicle first stopped after the point of time when the automatic braking control is switched to inactive is greater than or equal to the reactivation separation distance threshold.

As described above, according to the present disclosure, it is possible to set a reactivation condition for reactivation an R-AEB system after a rear emergency braking function is deactivated by a driver's braking input in the R-AEB system or a rear-end collision avoidance apparatus, thereby securing both convenience and safety of the driver.

More specifically, it is possible to optimally set a reactivation condition for performing a reactivation of a rear emergency braking function based on whether an engine operates after the rear emergency braking function is deactivated by a driver's braking input in an operation such as backward parking or the like, a vehicle speed and vehicle traveling distance after the rear emergency braking function is deactivated, a distance from an initial stoppage position to an obstacle after the rear emergency braking function is deactivated, and the like, thereby securing both convenience and safety of the driver.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1:
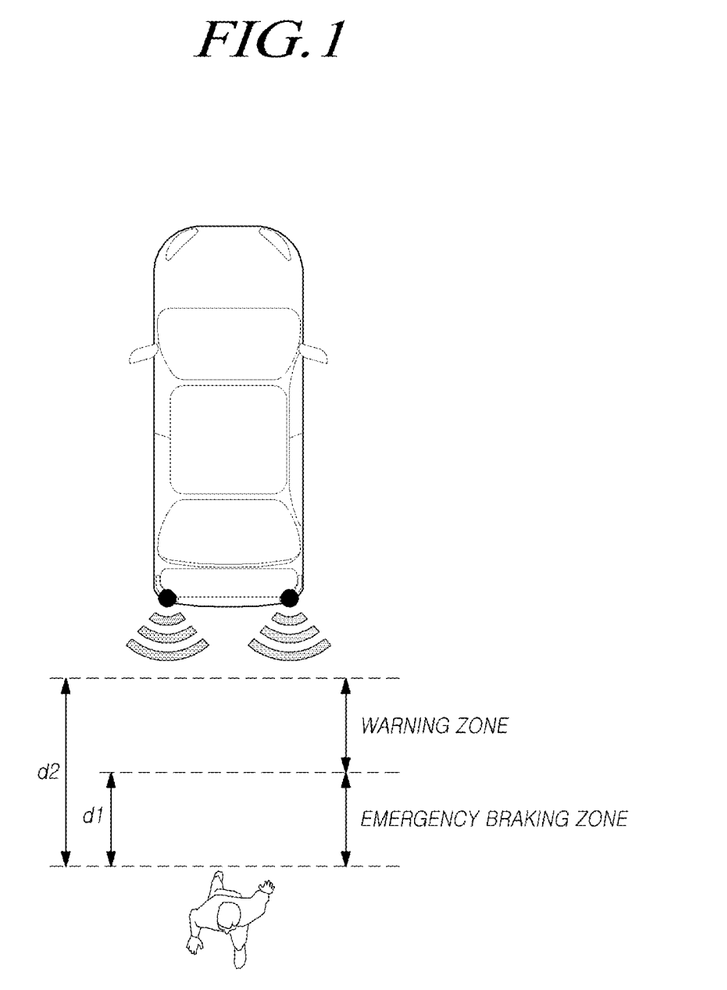
FIG. 1 is a view showing the operation principle of a Rear Autonomous Emergency Braking (R-AEB) system to which the present embodiment is applied.

FIG. 1 is a view showing the operation principle of a rear autonomous emergency braking system to which the present embodiment is applied.

As shown in FIG. 1, the rear autonomous emergency braking (hereinafter also referred to as R-AEB) system operates when a vehicle speed is zero or more in a reverse shift gear state, and measures a distance to a rear obstacle and a Time-To-Collision (TTC) using a rear sensor mounted in the rear of the vehicle.

The R-AEB system provides a warning to a driver when the distance to the rear obstacle and/or the TTC are in a warning zone, and automatically performs braking even though the driver's braking input does not occur when the distance to the rear obstacle and/or the TTC are in an emergency braking zone.

That is, only based on the distance to the rear obstacle, the R-AEB system performs warning when the distance to the rear obstacle reaches d2, and starts automatic braking when the distance to the rear obstacle reaches d1.

In this manner, in the R-AEB system, in a case in which there is a rear obstacle when the vehicle is moving backward, a warning and automatic braking are performed to prevent a rear collision.

Figure 2:
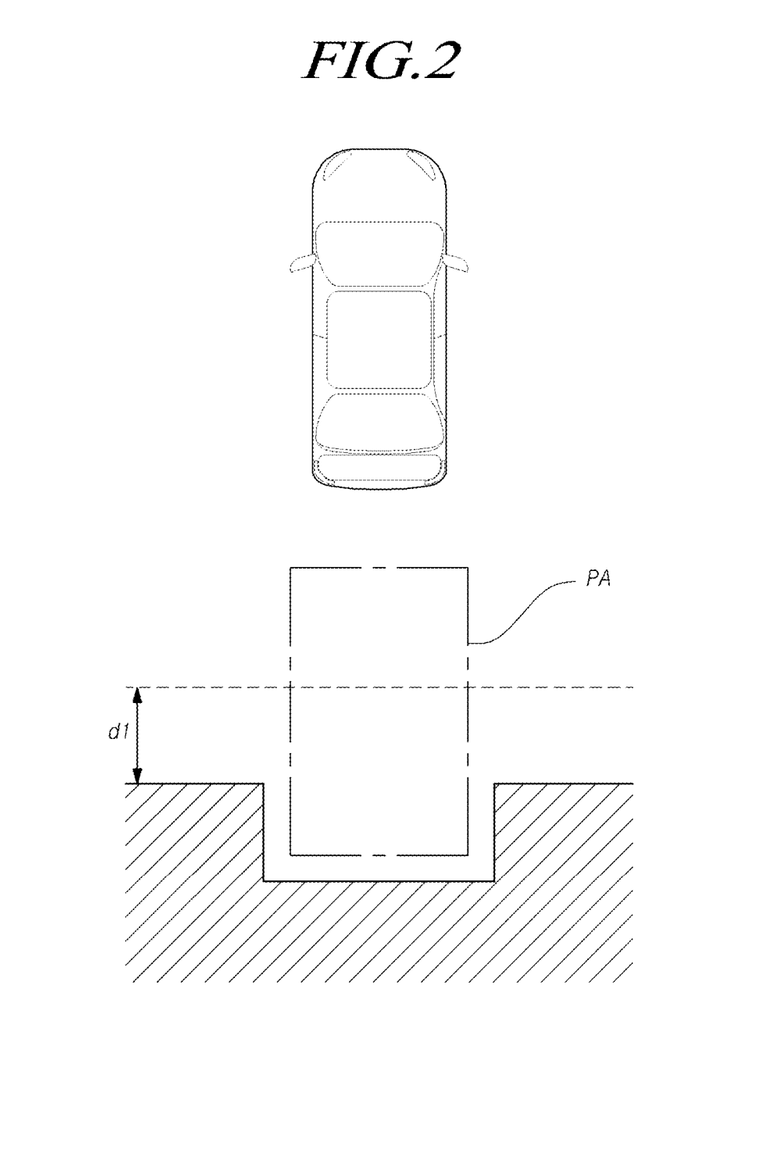
FIG. 2 is a view showing a situation to which the present embodiment is applied, that is, a situation in which backward parking is performed in a parking area located in the rear.
Figure 3:
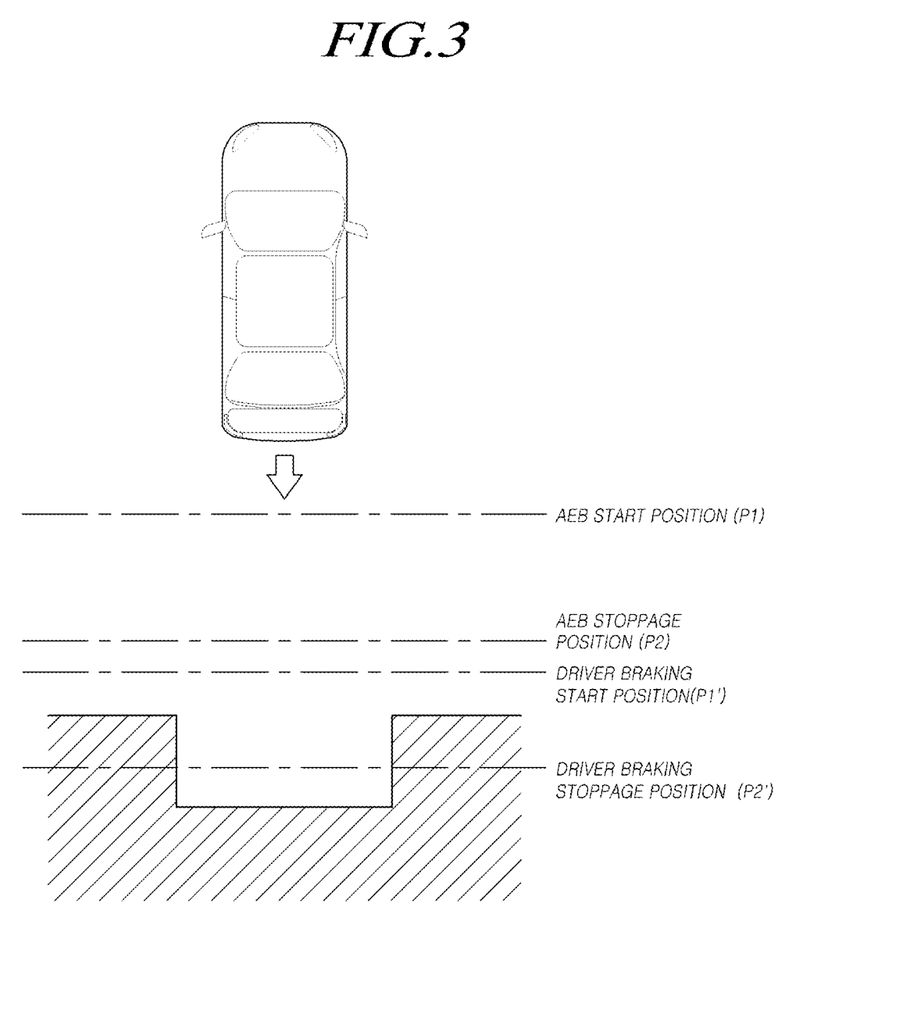
FIG. 3 is a view showing a case in which the R-AEB system of FIG. 1 is operated in a state as shown in FIG. 2.

FIG. 2 is a view showing a situation to which the present embodiment is applied, that is, a situation in which backward parking is performed in a parking area located in the rear, and FIG. 3 is a view showing a case in which the R-AEB system of FIG. 1 is operated in a state as shown in FIG. 2.

Meanwhile, in a state in which such an R-AEB system operates, when the vehicle is parked backward in a parking space PA extended rearward as shown in FIG. 2, a distance from an edge protrusion area of the retracted parking space even in a state in which the vehicle does not enter the parking space is measured, so that emergency braking can be performed in a state in which the vehicle does not enter a desired parking space.

As shown in FIG. 3, when the rear of the vehicle reaches P1 which is an emergency braking start position at the time of backward parking of the vehicle, the R-AEB system automatically imparts a braking force so that the vehicle stops at P2 which is an emergency braking stoppage position.

However, when the driver operates the vehicle manually, in order to park the vehicle in a predetermined parking space, driver braking is started at P1' which is a driver braking start position, and as a result, the vehicle stops at P2', which is a driver braking stoppage position. In this manner, the vehicle may be automatically braked by the R-AEB system even though the rear of the vehicle does not reach a desired stoppage position determined by the driver at the time of backward parking. This can cause discomfort to the driver.

This case may not occur only in the state of the retracted parking space as shown in FIG. 2, and may occur even when other vehicles are parked on both sides of the vehicle or when the vehicle has to go deep to the rear to complete parking even in a normal parking space.

Meanwhile, in a general R-AEB system, when a driver's braking input or acceleration input occurs in a state in which an R-AEB function is activated, that is, in a state in which an automatic braking force is applied, it is possible to deactivate the R-AEB function.

For example, in a state in which an automatic braking force is applied between the emergency braking start position P1 and the automatic braking stoppage position P2 at the backward traveling of the vehicle as shown in FIG. 3, when a driver's braking input occurs due to an action of the driver such as stepping on a brake pedal or when a driver's acceleration input occurs due to an action of the driver such as stepping on an accelerator pedal, the R-AEB system recognizes that the driver does not desire emergency automatic braking and accordingly deactivates the R-AEB function.

In this manner, when the state in which the R-AEB function is inactivated or deactivation is continued, there may arise a problem that a subsequent rear collision cannot be prevented. To solve this problem, an R-AEB reactivation condition for reactivating the corresponding operation after the R-AEB function is deactivated should also be set.

Meanwhile, in a general R-AEB system, a first condition that is a backward traveling state as a basic operation condition of the R-AEB system and a second condition that the vehicle speed is zero or more are set, and the R-AEB system may be reactivated when only first and second conditions are satisfied.

As described above, it is general that the initial R-AEB operation condition and the R-AEB reactivation condition after the R-AEB function is deactivated are the same, and thus it may cause discomfort to the driver in the case of FIG. 3.

That is, in the state shown in FIG. 3, the driver desires to enter the driver braking stoppage position P2' which is a driver's desired stoppage position, but automatic braking is started at the automatic braking start position P1 and the vehicle is stopped at the automatic braking stoppage position P2 by the R-AEB operation. Thus, the driver applies a braking force or acceleration input between the positions P1 and P2, so that the R-AEB function is deactivated.

In this state, the driver tries to stop the vehicle at the braking stoppage position P2' as shown in FIG. 3 by advancing the vehicle by a certain distance and then backwardly moving the vehicle again or directly further backwardly moving the vehicle.

However, when backward traveling is performed after the R-AEB function is deactivated or when backward traveling is performed after advancing the vehicle, the R-AEB operation is reactivated, so that the driver may not enter the desired braking stoppage position P2'.

Figure 4:
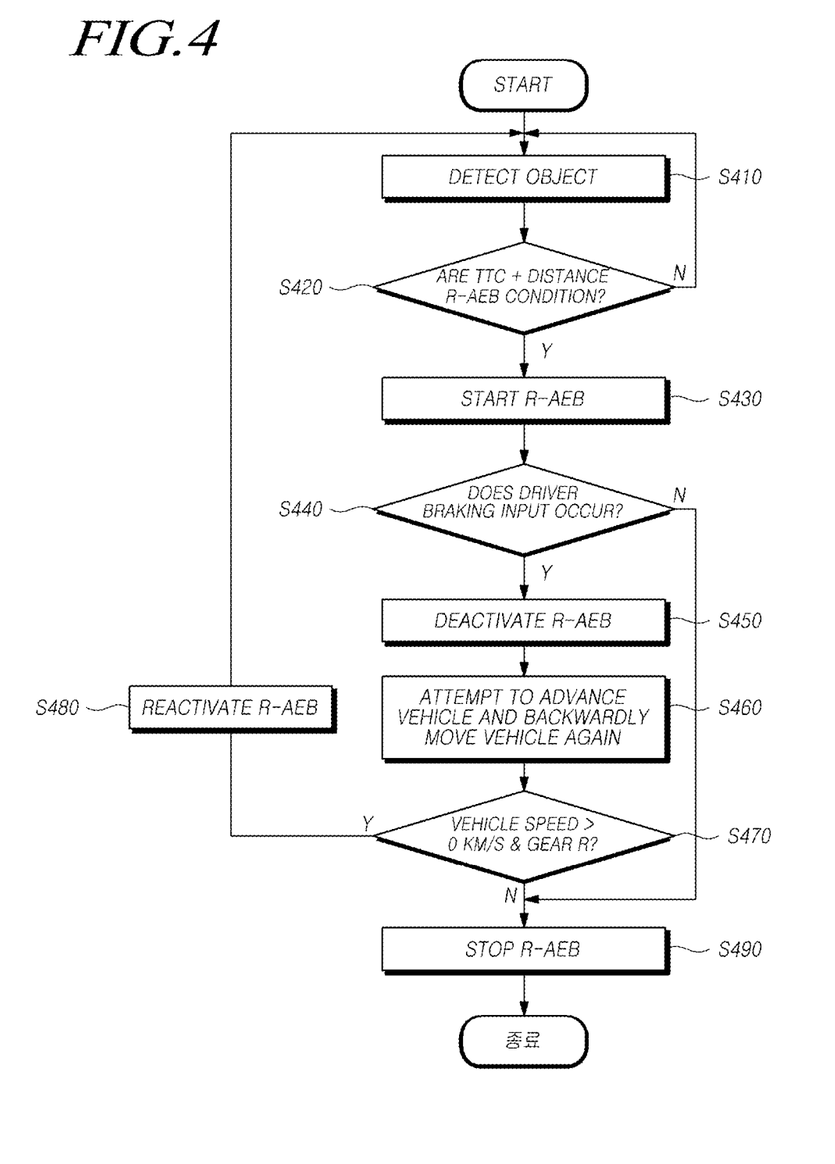
FIG. 4 is a flowchart showing a backward parking process of FIG. 3.

FIG. 4 is a flowchart showing a backward parking process of FIG. 3, which will be described in detail.

A rear obstacle is first detected using a rear sensor in operation S410 and whether an R-AEB operation is started is determined by comparing a distance from the rear of the vehicle to the rear obstacle with a reference value in operation S420.

When an R-AEB start condition is satisfied, an R-AEB system operates by applying an automatic braking force in operation S430, determines whether a driver's braking input occurs in the above state in operation S440, and an R-AEB function is deactivated in operation S450 when a driver's braking input occurs.

In this state, the driver attempts to advance the vehicle and backwardly move the vehicle again in order to enter the driver braking stoppage position as shown in FIG. 3 in operation S460. In operation S470, a reverse shift gear state and a state in which the vehicle speed is zero are detected when backward traveling is performed again. Accordingly, in operation S480, the R-AEB system is reactivated, and the corresponding process proceeds to operation S410.

Of course, when an R-AEB deactivated condition such as the driver's braking input is not generated during the R-AEB operation, the vehicle stops at an automatic braking stoppage position in operation S490.

In this manner, there is a problem in that the driver cannot enter a desired rear position because an R-AEB reactivation condition is not separately set after the R-AEB function is deactivated.

Figure 5:
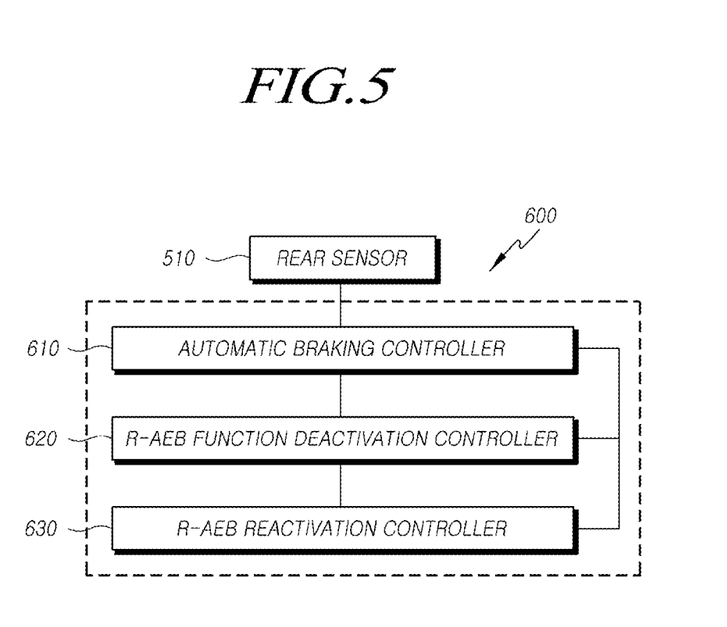
FIG. 5 is a functional block diagram showing a vehicle control apparatus and a rear-end collision avoidance apparatus according to the present embodiment.

FIG. 5 is a functional block diagram showing a vehicle control apparatus and a rear-end collision avoidance apparatus according to the present embodiment.

The vehicle control apparatus according to the present embodiment may roughly include a rear sensor 510 configured to detect a rear obstacle, and a rear-end collision avoidance apparatus 600 configured to deactivate automatic braking and to perform reactivation control according to the present embodiment.

The rear sensor 510 collectively refers to sensors mounted on the rear or rear lateral side of the vehicle to detect a distance to a rear object, a position of the vehicle, and a relative speed of the vehicle, and may include an ultrasonic sensor, a radar sensor, a lidar sensor, a camera sensor, and the like.

In addition, an image sensor that can be used as one of the rear sensors may be a vehicle image sensor represented by a camera, an image system, or a vision system. Such a vehicle image sensor may include a front camera having a front view of the vehicle, a rear camera having a rear view of the vehicle, and a rear side camera having a side view or a rear side view of the vehicle. In some cases, the vehicle image sensor may selectively include one or more of these cameras in various directions, and may include the rear camera or the rear side camera in the present embodiment.

Such a camera performs a function of capturing image data around the vehicle and transmitting the captured image data to a processor or a controller, and the vision system or the image sensor according to the present embodiment may further include an electronic control unit (ECU) or image processor that processes the captured image data and displays the processed image data on a display or the like.

In addition, in the vision system or the image sensor in the present embodiment, data transmission or signal communication from the camera to the image processor may further include an appropriate data link or communication link such as a vehicle network bus or the like.

Further, the vehicle to which the present embodiment is applied may further include a non-image sensor such as a radar sensor or an ultrasonic sensor.

Such a non-image sensor is disposed in a vehicle and performs a function of capturing sensing data to detect one of objects around the vehicle. Specifically, the non-image sensor may refer to a sensor that transmits electromagnetic waves such as radar waves or ultrasonic waves and receives and analyzes a signal reflected from the object, thereby calculating information such as a distance to a target object, a position of the object, or the like.

The radar sensor may refer to a sensor that transmits a high frequency radar signal of several tens of GHz, receives a reflection signal reflected from an object, and calculates a distance to the object, an angle, a relative speed, and the like based on a time period between a reception point of the received reflection signal and a transmission point thereof, a phase change of electromagnetic waves, and the like.

The radar sensor or radar system used in the present disclosure includes at least one radar sensor unit, for example, one or more of a frontal sensing radar sensor mounted on the front of the vehicle, a rear sensing radar sensor mounted on the rear of the vehicle, and a side or rear side sensing radar sensor mounted on each side of the vehicle. Such a radar sensor or radar system may include an ECU or processor that analyzes transmission and reception signals and processes data to detect information about an object. Data transmission or signal communication from the radar sensor to the ECU may utilize a communication link such as an appropriate vehicle network bus or the like.

Such a radar sensor includes one or more transmission antennas for transmitting a radar signal and one or more reception antennas for receiving a reflected signal received from the object.

Meanwhile, the radar sensor according to the present embodiment can employ a multi-dimensional antenna arrangement and a signal transmission/reception method of multiple input multiple output in order to form a virtual antenna aperture larger than an actual antenna aperture.

For example, in order to achieve both horizontal and vertical angular precision and resolution, a two-dimensional radar antenna array is used. Using the two-dimensional radar antenna array, signals are transmitted and received by two scans individually (temporally multiplexed) horizontally and vertically, and MIMO can be used separately from two-dimensional radar horizontal and vertical scans (time multiplexing).

More specifically, in the radar sensor according to the present embodiment, a two-dimensional antenna array configuration including a transmission antenna portion including a total of 12 transmission antennas Tx and a reception antenna portion including 16 reception antennas Rx can be adopted, and as a result, a total of 192 virtual reception antenna arrays can be obtained.

In this case, the transmission antenna portion includes three transmission antenna groups including four transmission antennas, wherein the first transmission antenna group is space apart from the second transmission antenna group by a predetermined distance in the vertical direction, and the first or second transmission antenna group may be space apart from a third transmission antenna group by a predetermined distance D in the horizontal direction.

In addition, the reception antenna portion may include four reception antenna groups including four reception antennas, and each reception antenna group is arranged to be space apart from each other in the vertical direction. The reception antenna portion may be disposed between the first transmission antenna group and the third transmission group space apart from each other in the horizontal direction.

In addition, in another embodiment, the antennas of the radar sensor are arranged in a two-dimensional antenna array, for example, each antenna patch has a Rhombus arrangement, thereby reducing unnecessary side lobes.

Alternatively, the two-dimensional antenna arrangement may include a V-shaped antenna array in which a plurality of radiation patches are arranged in a V-shape and, more specifically, may include two V-shaped antenna arrays. At this time, a single feed to the apex of each V-shaped antenna array is performed.

Alternatively, the two-dimensional antenna array may include an X-shaped antenna array in which a plurality of radiation patches are arranged in an X-shape and, more specifically, may include two X-shaped antenna arrays. At this time, a single feed is performed at the center of each X-shaped antenna array.

In addition, the radar sensor according to the present embodiment may use an MIMO antenna system in order to realize detection accuracy or resolution in vertical and horizontal directions.

More specifically, in the MIMO system, each transmission antenna may transmit a signal having an independent waveform different from those of the other transmission antennas. That is, each transmission antenna may transmit a signal having an independent waveform different from those of the other transmission antennas, and each reception antenna may determine from which transmission antenna a reflected signal reflected from an object was transmitted due to the different waveforms of these signals.

In addition, the radar sensor according to the present embodiment may be configured to include a radar housing that accommodates a substrate including transmission/reception antennas and a circuit, and a radome that constitutes an appearance of the radar housing. At this time, the radome may be made of a material capable of reducing the attenuation of transmitted and received radar signals, and may be composed of front and rear bumpers, a grille, and side bodies of the vehicle, or outer surfaces of the vehicle components.

That is, the radome of the radar sensor may be disposed inside the grille, the bumper, the vehicle body of the vehicle, or the like, and may be disposed as a part of a component constituting the outer surface of the vehicle, such as a part of the grille, the bumper, or the vehicle body so that it is possible to provide the convenience of mounting the radar sensor while improving the vehicle aesthetics.

The ultrasonic sensor also refers to a sensor that emits ultrasonic waves having frequencies greater than those of sound waves and receives/analyzes reflected signals reflected from the object, thereby calculating a distance to an object, an angle, a relative speed, and the like.

The radar sensor or ultrasonic sensor may be widely used as a sensor of a vehicle may be used, and thus a detailed description thereof will be omitted.

In the present specification, the rear-end collision avoidance apparatus may be used in the same meaning as an R-AEB system or an R-AEB apparatus, and may be represented by a controller or a domain controller in this embodiment.

That is, the controller according to the present embodiment may include a processor that processes one or more of the image data and sensing data from the rear sensor including one or more of the image sensor configured to have a field of view exterior of the rear of the vehicle and to capture image data and the non-image sensor configured to detect a distance to capture sensing data for detecting a distance to an obstacle in the rear of the vehicle.

In addition, the controller or the domain controller according to the present embodiment may be implemented as a domain control unit (DCU) including a function of receiving and processing information of a plurality of vehicle sensors or relaying transmission and reception of sensor signals and a function of performing reactivation of automatic braking for preventing a rear collision according to the present embodiment, but is not limited thereto.

The controller or the domain controller may control behavior of the vehicle to prevent a collision with a rear obstacle. The controller or the domain controller may perform automatic braking by assigning a braking force to the vehicle when the collision with the rear obstacle is imminent, may deactivate automatic braking control when a driver's braking input occurs during an automatic braking operation, and may determine reactivation of the automatic braking control based on one or more of an engine operation state after the automatic braking control is deactivated, a vehicle speed, a vehicle traveling distance, and a separation distance from an initial stoppage position to the obstacle after the R-AEB function is deactivated and may reactivate automatic braking control.

The rear-end collision avoidance apparatus 600 or the controller or the domain controller according to the present embodiment may be configured to roughly include an automatic braking controller 610 configured to perform R-AEB control, a function deactivation controller 620 configured to deactivate or deactivate the R-AEB function in a deactivated condition, and a reactivation controller 630 configured to determine whether the R-AEB reactivation condition is satisfied and to activate the R-AEB function again when the R-AEB reactivation condition is satisfied.

Respective components constituting the rear-end collision avoidance apparatus 600 according to the present embodiment will be described in detail.

The automatic braking controller 610 performs the R-AEB operation of automatically assigning a braking force to the vehicle based on one or more of a distance to the rear obstacle detected by the rear sensor 510, which includes one or more of the image sensor and the non-image sensor, and a TTC with the rear obstacle.

Specifically, the automatic braking controller 610 may start automatic braking when one or more of a distance condition in which the distance to the rear obstacle reaches a control start threshold distance and a time condition in which the TTC with the rear obstacle reaches a control start threshold TTC, and then may control the vehicle to stop at a stoppage position which is a position in which the distance to the rear obstacle reaches a first threshold value by assigning the braking force regardless of driver's control when a driver's braking input does not occur.

That is, the automatic braking controller 610 may start automatic braking of the vehicle regardless of the driver's braking input when one or more of a condition where the distance to the rear obstacle is equal to or shorter than a predetermined value and a condition where the TTC with the rear obstacle is equal to or shorter than a predetermined time is satisfied, and may control the vehicle to stop at the automatic braking stoppage position by assigning a predetermined braking force.

Meanwhile, the function deactivation controller 620 may deactivate the function of the automatic braking controller when a deactivated condition which is one or more of the driver's braking input and the driver's acceleration input is satisfied during the braking control of the automatic braking controller 610.

The deactivated condition of the automatic control function is preferably the driver's braking input, but it not limited thereto. The deactivated condition thereof may be the driver's acceleration input or an instruction to forcibly deactivate the automatic braking control.

Meanwhile, the reactivation controller 630 may determine whether a reactivation condition of the automatic braking control is satisfied based on one or more of an engine operation state after the automatic braking controller is deactivated or deactivated by the function deactivation controller 620, a vehicle speed, a vehicle traveling distance, and a separation distance from an initial stoppage position to the obstacle after the R-AEB function is deactivated, and may reactivate the automatic braking controller 510 when the reactivation condition is satisfied.

The reactivation controller 630 may determine the reactivation of the automatic braking controller when one or more of four conditions are satisfied. The four conditions include a first condition in which an engine is turned off at least once after the automatic braking controller is deactivated, a second condition in which the vehicle speed reaches a reactivation speed threshold value after the automatic braking controller is deactivated, a third condition in which an accumulated traveling distance of the vehicle reaches a reactivation traveling distance threshold value after the automatic braking controller is deactivated, and a fourth condition in which the distance from the initial stoppage position to the rear obstacle is equal to or greater than a reactivation distance threshold value after the automatic braking controller is deactivated.

Hereinafter, the four reactivation conditions according to the present embodiment will be described in detail.

First, the reactivation controller 630 may reactivate the R-AEB function only when the first condition in which the engine is turned off at least once after the automatic braking controller is deactivated.

Such a first condition can be regarded as not being in a state in which advancing and backward traveling again should be performed as shown in FIG. 3 or simple backward traveling should be further performed when the engine is turned off at least once and then turned on again after the R-AEB function is deactivated, and therefore the R-AEB system may be reactivated.

In addition, the reactivation controller 630 may activate the R-AEB function again only when the second condition in which the vehicle speed reaches the reactivation speed threshold value after the automatic braking controller is deactivated is satisfied.

When advancing the vehicle or backwardly moving the vehicle again after the R-AEB function is deactivated, the driver is only in a state of moving the vehicle to the extent that the driver corrects the parking position as shown in FIG. 3. Accordingly, when the vehicle traveling distance is equal to or more than a predetermined value, that is, the reactivation speed threshold value or more, the driver can be regarded as not being in the state as shown in FIG. 3, so that the R-AEB system is restarted.

At this time, the reactivation speed threshold value determining the second condition may be preferably 5 km/s.

That is, the reactivation speed threshold value according to the second condition is a threshold value for determining whether minute vehicle movement control is performed after the R-AEB function is deactivated, and thus the reactivation speed threshold value may be set as a constant vehicle speed Akm/s. However, as a result of simulation several times, the reactivation speed threshold value is determined to be 5 km/s in consideration of the fact that the vehicle speed is equal to or less than 5 km/s at the time of manual vehicle control of the driver in the environment shown in FIG. 3.

In addition, the reactivation controller 630 may reactivate the R-AEB function only when the third condition in which the traveling distance of the vehicle reaches the reactivation traveling distance threshold value after the automatic braking controller is deactivated.

When advancing the vehicle or backwardly moving the vehicle again after the R-AEB function is deactivated, the driver is only in a state of moving the vehicle to the extent that the driver corrects the parking position as shown in FIG. 3. Accordingly, when the vehicle speed is equal to or more than a predetermined value, that is, the reactivation speed threshold value or more, the driver can be regarded as not being in the state as shown in FIG. 3, so that the R-AEB system is restarted.

At this time, the reactivation traveling distance threshold value determining the third condition may be preferably 3 m.

That is, the reactivation traveling distance threshold value according to the third condition is a threshold value for determining whether minute vehicle movement control is performed after the R-AEB function is deactivated, and thus the reactivation traveling distance threshold value may be set as a constant traveling distance Bm (meter). However, as a result of simulation several times, the reactivation traveling distance threshold value is determined to be 3 m in consideration of the fact that the vehicle traveling distance is less than 3 m at the time of manual vehicle control of the driver in the environment shown in FIG. 3.

The reactivation traveling distance threshold value in the third condition may be a cumulative traveling distance accumulated after the R-AEB function is deactivated, but the present disclosure is not limited thereto. The reactivation traveling distance threshold value may be obtained based on one traveling distance in which the vehicle moves to the stoppage position by an initial advancing or initial backward traveling operation after the R-AEB function is deactivated.

In addition, the reactivation controller 630 may activate the R-AEB function again only when the fourth condition in which the distance from the initial stoppage position to the rear obstacle is equal to or greater than the reactivation distance threshold value after the automatic braking controller is deactivated is satisfied.

As shown in FIGS. 2 and 3, as to a position where the driver stops the vehicle initially after deactivating the R-AEB function by further assigning a braking input while the R-AEB function is operated, the distance to the rear obstacle is likely to be equal to or less than a certain distance.

That is, when it is assumed that the automatic braking stoppage position (P2 in FIG. 3) in which the vehicle is stopped by the R-AEB function is a position space apart from the rear obstacle by an A meter, the position in which the vehicle is stopped initially after driver's intervention as shown in FIGS. 2 and 3, that is, the driver's braking stoppage position P2' of FIG. 3 may be obviously a position in which the distance to the rear obstacle is smaller than the A meter.

Accordingly, a case in which the position in which the driver manually controls the vehicle after the R-AEB function is deactivated so that the vehicle is stopped initially is greater than a predetermined distance from the rear obstacle, that is, a reactivation separation distance threshold value may be regarded as a condition in which the R-AEB function can be reactivated.

At this time, the reactivation separation distance threshold value may be preferably 1 m.

That is, the reactivation separation distance threshold value according to the fourth condition is a threshold value that is set assuming that the driver approaches the rear obstacle at a predetermined distance or more after the R-AEB function is deactivated, and may be set as a constant separation distance Cm (meter). However, as a result of simulation several times, the reactivation separation distance threshold value according to the fourth condition may be determined to be 1 m in consideration of the fact that the position where the vehicle is initially stopped by the manual vehicle control of the driver in the environment shown in FIG. 3 has a separation distance from the rear obstacle which does not exceed 1 m.

Such a reactivation separation distance threshold value according to the fourth condition may be obtained based on a position where the vehicle is initially stopped by backward traveling after the R-AEB function is deactivated, but the present disclosure is not limited thereto. The reactivation separation distance threshold value may be obtained based on a position where the vehicle is initially stopped by advancing the vehicle without stopping the vehicle or advancing the vehicle and backwardly moving the vehicle again after the R-AEB function is deactivated.

Meanwhile, the reactivation controller 630 may reactivate the R-AEB function when one of the above-described first to fourth conditions is satisfied, but the present disclosure is not limited thereto. When two or more of the first to fourth conditions are simultaneously satisfied, the R-AEB function may be reactivated.

For example, in order to carefully determine the reactivation, only when the second condition and the third condition are simultaneously satisfied, the R-AEB function may be reactivated.

Meanwhile, the automatic braking controller 610, the function deactivation controller 620, and the reactivation controller 630 included in the vehicle control apparatus or the rear-end collision avoidance apparatus 600 according to the present embodiment may be implemented as some modules constituting the vehicle control apparatus or the R-AEB system according to the present embodiment or some modules of the ECU therefor.

Some modules or ECU constituting the vehicle control apparatus or the R-AEB system may include a storage device such as a processor or a memory, a computer program capable of performing a specific function, and the like. The above-described automatic braking controller 610, function deactivation controller 620, and reactivation controller 630 may be implemented as software modules capable of performing respective unique functions.

Since such software can be sufficiently coded by those skilled in the art from the matters described in this specification, description of specific software forms will be omitted.

As described above, using the vehicle control apparatus or the rear-end collision avoidance apparatus, it is possible to optimally set a reactivation condition for performing a reactivation of a rear emergency braking function based on whether an engine operates after the rear emergency braking function is deactivated by a driver's braking input in an operation such as backward parking or the like, a vehicle speed and vehicle traveling distance after the rear emergency braking function is deactivated, a distance from an initial stoppage position to an obstacle after the rear emergency braking function is deactivated, and the like, thereby securing both convenience and safety of the driver.

Figure 6:
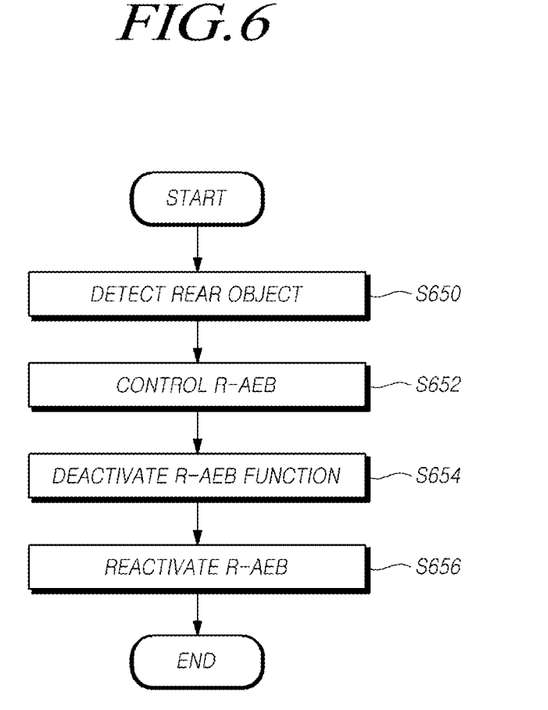
FIG. 6 is a schematic flowchart showing a rear-end collision avoidance method according to the present embodiment.

FIG. 6 is a schematic flowchart showing a rear-end collision avoidance method according to the present embodiment.

The rear-end collision avoidance method according to the present embodiment may be performed in such a manner to roughly include operation S650 of detecting a rear obstacle using a rear sensor of a vehicle; automatic braking control operation S652 of automatically assigning a braking force to the vehicle based on one or more of a distance to the rear obstacle detected by the rear sensor of the vehicle and a TTC with the rear obstacle; function deactivation control operation S654 of deactivating an automatic braking control function when a driver's braking input occurs during braking control of automatic braking control operation S652; and reactivation control operation S656 of determining reactivation of an automatic braking controller based on one or more of an engine operation state after the automatic braking control function is deactivated, a vehicle speed, a vehicle traveling distance, and a separation distance from an initial stoppage position to the obstacle after an R-AEB function is deactivated and reactivation the automatic braking controller.

Figure 7:
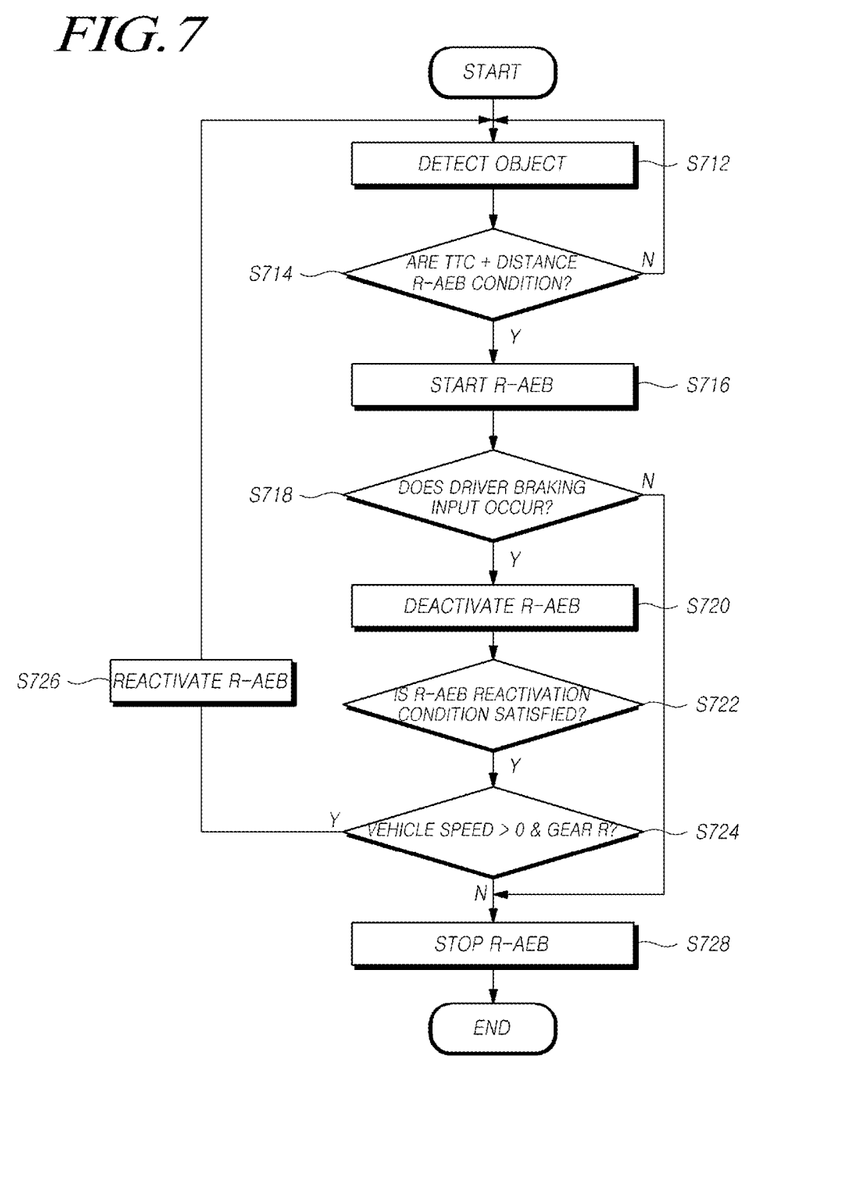
FIG. 7 is a detailed flowchart showing a rear-end collision avoidance method according to the present embodiment.

FIG. 7 is a detailed flowchart showing a rear-end collision avoidance method according to the present embodiment.

The rear-end collision avoidance method according to the present embodiment first detects a rear object using a rear sensor in operation S712, and determines whether to start an R-AEB operation by comparing a distance to a rear obstacle and a TTC with a reference value in operation S714.

When an R-AEB start condition is satisfied, the rear-end collision avoidance method assigns an automatic braking force to a vehicle so that the R-AEB function is operated in operation S716, determines whether a driver's braking input occurs in this state in operation S718, and deactivates the R-AEB function in operation S720 when the driver's braking input occurs.

In this state, the driver attempts to continuously move backwardly or advance the vehicle and backwardly move the vehicle again in order to enter the driver braking stoppage position as shown in FIG. 3. At this time, the reactivation controller 630 according to the present embodiment determines whether reactivation conditions such as the first to fourth conditions are satisfied in operation S722.

That is, when the first to fourth conditions described based on the engine operation state after the automatic braking control function is deactivated, the vehicle speed, the vehicle traveling distance, and the separation distance from the initial stoppage position to the obstacle after the R-AEB function is deactivated are satisfied, the R-AEB function is activated again.

Next, when the vehicle speed is zero or more in a reverse shift gear state whether the vehicle is backwardly moved is determined in operation S724, and then the R-AEB function is reactivated in operation S726 and the corresponding method proceeds to operation S712, so that the vehicle is finally stopped at the automatic braking stoppage position in operation S728.

As described above, using the vehicle control apparatus or the rear-end collision avoidance apparatus, it is possible to optimally set a reactivation condition for performing a re-operation of a rear emergency braking function based on whether an engine operates after the rear emergency braking function is deactivated by a braking input of a driver in an operation such as backward parking or the like, a vehicle speed and vehicle traveling distance after the rear emergency braking function is deactivated, a distance from an initial stop position to an obstacle after the rear emergency braking function is deactivated, and the like, thereby securing both convenience and safety of the driver.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A vehicle control apparatus comprising:
an image sensor configured to capture image data while having a field of view exterior of a vehicle;
a rear sensor configured to capture sensing data for detecting a distance to a rear obstacle around the vehicle; and
a controller comprising a processor for processing one or more of the image data captured by the image sensor or the sensing data captured by the rear sensor,
wherein the controller is configured to:
perform automatic braking control by automatically assigning a braking force to the vehicle without a driver's braking input when a collision with the rear obstacle is imminent,
deactivates the automatic braking control when a driver's braking input occurs during an automatic braking operation, and
reactivate the automatic braking control, which has been deactivated manually by the driver's braking input, when at least one of a first condition in which an engine is turned off at least once and then turned on again after the automatic braking control has been deactivated, or a second condition in which a vehicle speed is equal to or greater than a reactivation speed threshold value after the automatic braking control has been deactivated, is satisfied.

2. The vehicle control apparatus of claim 1,
wherein the controller determines the reactivation of the automatic braking control when one or more of the first condition in which the engine is turned off at least once and then turned on again after the automatic braking control has been deactivated, the second condition in which the vehicle speed is equal to or greater than the reactivation speed threshold value after the automatic braking control has been deactivated, a third condition in which a vehicle traveling distance reaches a reactivation traveling distance threshold value after the automatic braking control has been deactivated, or a fourth condition in which a separation distance from an initial stoppage position to the rear obstacle is equal to or greater than a reactivation separation distance threshold value after the automatic braking control has been deactivated is satisfied.

3. The vehicle control apparatus of claim 2, wherein in the third condition, whether the vehicle traveling distance reaches the reactivation traveling distance threshold value after the automatic braking control has been deactivated is determined by obtaining a traveling distance of the vehicle in which the vehicle moves to a next stoppage position by an initial forward operation or an initial backward operation immediately after the automatic braking control has been deactivated.

4. The vehicle control apparatus of claim 1,
wherein the controller is configured to:
automatically assign the braking force to the vehicle based on one or more of the detected distance to the rear obstacle or a Time-To-Collision (TTC) with the rear obstacle,
deactivate a function of the automatic braking control when the driver's braking input occurs during the automatic braking control of the controller,
determine the reactivation of the automatic braking control based on one or more of an engine operation state after the automatic braking control has been deactivated, the vehicle speed, a vehicle traveling distance, or a separation distance from an initial stoppage position to the rear obstacle after a Rear Autonomous Emergency Braking (R-AEB) function has been deactivated, and
reactivate the automatic braking control.

5. The vehicle control apparatus of claim 4,
wherein the controller starts the automatic braking control when one or more of a distance condition in which the distance to the rear obstacle reaches a control start threshold distance or a time condition in which a collision prediction time to the rear obstacle reaches a control start threshold TTC is satisfied, and then controls the vehicle to stop at an automatic braking stoppage position which is a position where the distance to the rear obstacle reaches a first threshold value by assigning the braking force regardless of driver's control when the driver's braking input does not occur.

6. The vehicle control apparatus of claim 5,
wherein the controller determines the reactivation of the automatic braking control when one or more of the first condition in which the engine is turned off at least once and then turned on again after the automatic braking control has been deactivated, the second condition in which the vehicle speed is equal to or greater than a reactivation speed threshold value after the automatic braking control has been deactivated, a third condition in which the vehicle traveling distance reaches a reactivation traveling distance threshold value after the automatic braking control has been deactivated, or a fourth condition in which the separation distance from the initial stoppage position to the rear obstacle is equal to or greater than a reactivation separation distance threshold value after the automatic braking control has been deactivated is satisfied.

7. The vehicle control apparatus of claim 6, wherein the reactivation speed threshold value of the second condition is 5 km/s, the reactivation traveling distance threshold value of the third condition is 3 m, and the reactivation separation distance threshold value of the fourth condition is 1 m.

8. The vehicle control apparatus of claim 1, wherein the controller determines the reactivation of the automatic braking control when the engine is turned off at least once and then turned on again after the automatic braking control has been deactivated.

9. A rear-end collision avoidance apparatus comprising:
an image sensor for capturing image data while having a field of view exterior of a rear of a vehicle;
a rear sensor for capturing sensing data for detecting a distance to a rear obstacle in the rear of the vehicle, and a Time-To-Collision (TTC) with the rear obstacle; and
a controller comprising at least one processor configured to process the image data captured by the image sensor and the sensing data captured by the rear sensor,
wherein the controller, responsive at least in part to processing by the at least one processor of the image data and the sensing data, is configured to:
perform an automatic braking operation by automatically assigning a braking force to the vehicle without a driver's braking input based on one or more of the distance to the rear obstacle or the TTC with the rear obstacle,
deactivate the automatic braking operation of the controller when a driver's braking input occurs during braking control,
determine a reactivation condition of the automatic braking operation, which has been deactivated manually by the driver's braking input, is satisfied when at least one of a first condition in which an engine is turned off at least once and then turned on again after the automatic braking operation has been deactivated, or a second condition in which a vehicle speed is equal to or greater than a reactivation speed threshold value after the automatic braking operation has been deactivated, is satisfied, and
upon determining the reactivation condition is satisfied, reactivate the automatic braking operation.

10. The rear-end collision avoidance apparatus of claim 9, wherein the controller determines the reactivation of the automatic braking operation when one or more of the first condition in which the engine is turned off at least once and then turned on again after the automatic braking operation has been deactivated, the second condition in which the vehicle speed is equal to or greater than the reactivation speed threshold value after the automatic braking operation has been deactivated, a third condition in which a vehicle traveling distance reaches a reactivation traveling distance threshold value after the automatic braking operation has been deactivated, or a fourth condition in which a separation distance from an initial stoppage position to the rear obstacle is equal to or greater than a reactivation separation distance threshold value after the automatic braking operation has been deactivated is satisfied.

11. The rear-end collision avoidance apparatus of claim 9,
wherein the controller configured to automatically assign the braking force to the vehicle based on one or more of the detected distance to the rear obstacle or the TTC with the rear obstacle, and deactivate the automatic braking operation when the driver's braking input occurs during the automatic braking operation of the controller, and determine the reactivation of the automatic braking operation based on one or more of an engine operation state after the controller has been deactivated, the vehicle speed, a vehicle traveling distance, or a separation distance from an initial stoppage position to the rear obstacle after a Rear Autonomous Emergency Braking (R-AEB) function has been deactivated and configured to reactivate the automatic braking operation of the controller.

12. The rear-end collision avoidance apparatus of claim 11,
wherein the controller starts the automatic braking operation when one or more of a distance condition in which the distance to the rear obstacle reaches a control start threshold distance or a time condition in which a collision prediction time to the rear obstacle reaches a control start threshold TTC is satisfied, and then controls the vehicle to stop at an automatic braking stoppage position which is a position where the distance to the rear obstacle reaches a first threshold value by assigning the braking force regardless of driver's control when the driver's braking input does not occur.

13. The rear-end collision avoidance apparatus of claim 12,
wherein the controller determines the reactivation of the automatic braking operation when one or more of the first condition in which the engine is turned off at least once and then turned on again after the automatic braking operation has been deactivated, the second condition in which the vehicle speed is equal to or greater than the reactivation speed threshold value after the automatic braking operation has been deactivated, a third condition in which the vehicle traveling distance reaches a reactivation traveling distance threshold value after the automatic braking operation has been deactivated, or a fourth condition in which the separation distance from the initial stoppage position to the rear obstacle is equal to or greater than a reactivation separation distance threshold value after the automatic braking operation has been deactivated is satisfied.

14. The rear-end collision avoidance apparatus of claim 13, wherein the reactivation speed threshold value of the second condition is 5 km/s, the reactivation traveling distance threshold value of the third condition is 3 m, and the reactivation separation distance threshold value of the fourth condition is 1 m.

15. A vehicle control apparatus comprising:
an image sensor configured to capture image data while having a field of view exterior of a vehicle;
a rear sensor configured to capture sensing data for detecting a distance to a rear obstacle around the vehicle; and
a controller comprising a processor for processing one or more of the image data captured by the image sensor or the sensing data captured by the rear sensor,
wherein the controller is configured to:
perform automatic braking control by automatically assigning a braking force to the vehicle without a driver's braking input when a collision with the rear obstacle is imminent,
deactivate the automatic braking control when a driver's braking input occurs during an automatic braking operation, and
determine a reactivation of the automatic braking control, which has been deactivated manually by the driver's braking input, is satisfied when at least one of a first condition in which an engine is turned off at least once and then turned on again after the automatic braking control has been deactivated, or a second condition in which a vehicle speed is equal to or greater than a reactivation speed threshold value after the automatic braking control has been deactivated, is satisfied.

16. The vehicle control apparatus of claim 15,
wherein the controller configured to automatically assign the braking force to the vehicle based on one or more of the detected distance to the rear obstacle or a Time-To-Collision (TTC) with the rear obstacle, and deactivate the automatic braking control of the controller when the driver's braking input occurs during the automatic braking control of the controller, and determine the reactivation of the automatic braking control based on one or more of an engine operation state after the automatic braking control has been deactivated, the vehicle speed, a vehicle traveling distance, or a separation distance from an initial stoppage position to the rear obstacle after a Rear Autonomous Emergency Braking (R-AEB) function has been deactivated and configured to reactivate the automatic braking control.

17. The vehicle control apparatus of claim 16,
wherein the controller starts the automatic braking control when one or more of a distance condition in which the detected distance to the rear obstacle reaches a control start threshold distance or a time condition in which a collision prediction time to the rear obstacle reaches a control start threshold TTC is satisfied, and then controls the vehicle to stop at an automatic braking stoppage position which is a position where the detected distance to the rear obstacle reaches a first threshold value by assigning the braking force regardless of driver's control when the driver's braking input does not occur.

18. The vehicle control apparatus of claim 17,
wherein the controller determines the reactivation of the automatic braking control when one or more of the first condition in which the engine is turned off at least once and then turned on again after the automatic braking control has been deactivated, the second condition in which the vehicle speed is equal to or greater than the reactivation speed threshold value after the automatic braking control has been deactivated, a third condition in which the vehicle traveling distance reaches a reactivation traveling distance threshold value after the automatic braking control has been deactivated, or a fourth condition in which the separation distance from the initial stoppage position to the rear obstacle is equal to or greater than a reactivation separation distance threshold value after the automatic braking control has been deactivated is satisfied.

19. The vehicle control apparatus of claim 18, wherein the reactivation speed threshold value of the second condition is 5 km/s, the reactivation traveling distance threshold value of the third condition is 3 m, and the reactivation separation distance threshold value of the fourth condition is 1 m.

20. The vehicle control apparatus of claim 15,
wherein the controller determines the reactivation of the automatic braking control, which has been deactivated manually by the driver's braking input, is satisfied when at least one of the first condition, the second condition, a third condition, or a fourth condition is satisfied,
wherein the first condition determines that the engine is turned off at least once and then turned on again after the automatic braking control has been deactivated,
wherein the second condition is that a vehicle speed is equal to or greater than the reactivation speed threshold value after the automatic braking control has been deactivated,
wherein the third condition determines that a cumulative movement distance of the vehicle, which is reset after the automatic braking control has been deactivated, is equal to or greater than a reactivation traveling distance threshold value,
wherein the fourth condition is that a distance from a position, where the vehicle first stopped after a point of time at which the automatic braking control has been deactivated, is greater than or equal to a reactivation separation distance threshold value, and
wherein the reactivation traveling distance threshold value of the third condition is 3 m, and the reactivation separation distance threshold value of the fourth condition is 1 m.

* * * * *